US011663314B2

(12) United States Patent
Giaume

(10) Patent No.: US 11,663,314 B2
(45) Date of Patent: May 30, 2023

(54) METHOD FOR AUTHENTICATING AN ON-CHIP CIRCUIT AND ASSOCIATED SYSTEM ON-CHIP

(71) Applicant: STMicroelectronics (Rousset) SAS, Rousset (FR)

(72) Inventor: Olivier Giaume, Brignoles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 243 days.

(21) Appl. No.: 17/071,094

(22) Filed: Oct. 15, 2020

(65) Prior Publication Data
US 2021/0117532 A1 Apr. 22, 2021

(30) Foreign Application Priority Data
Oct. 18, 2019 (FR) ........................................ 1911680

(51) Int. Cl.
*G06F 21/00* (2013.01)
*G06F 21/44* (2013.01)

(52) U.S. Cl.
CPC .................................... *G06F 21/44* (2013.01)

(58) Field of Classification Search
CPC ............. G06F 21/44; G06F 15/00; G06F 1/08
See application file for complete search history.

(56) References Cited

U.S. PATENT DOCUMENTS

| 5,339,404 A | 8/1994 | Vandling, III |
| 8,782,396 B2 * | 7/2014 | Ziola ................... H04W 12/062 713/155 |
| 2006/0126425 A1 * | 6/2006 | Kim ...................... G11C 7/1066 365/189.11 |
| 2008/0244305 A1 * | 10/2008 | Troppmann ........ G06F 11/1641 712/30 |
| 2012/0043932 A1 * | 2/2012 | Nakama .............. H02J 7/00036 320/108 |
| 2014/0115401 A1 | 4/2014 | Ito |

(Continued)

OTHER PUBLICATIONS

EE|Times, "Cortus to Target Security to Win 32-Bit Processor Race," https://www.eetimes.com/cortus-to-target-security-to-win-32-bit-processor-race/?page_number=2&piddl_msgpage=2#, Oct. 7, 2014, 5 pages.

(Continued)

*Primary Examiner* — Philip J Chea
*Assistant Examiner* — Rodman Alexander Mahmoudi
(74) *Attorney, Agent, or Firm* — Slater Matsil, LLP

(57) ABSTRACT

An embodiment device comprises a first processing unit configured to process an initial data line and deliver a first processed data line, a first delay unit coupled to the output of the first processing unit and configured to deliver a delayed first processed data line delayed by a first delay, a second delay unit configured to deliver the delayed initial data line delayed by a second delay, a second processing unit coupled to the output of the second delay unit and configured to process the delayed initial data line and deliver a delayed second processed data line, and a comparison unit configured to compare the contents of the delayed first and second processed data lines and deliver a non-authentication signal if the contents are not identical, the first and second delays being equal to a variable value.

20 Claims, 6 Drawing Sheets

(56) References Cited

U.S. PATENT DOCUMENTS

2016/0063270 A1* 3/2016 Brock ................. G06F 21/6218
                                                                726/28
2017/0244546 A1* 8/2017 Stark ..................... H04L 9/002
2018/0152282 A1* 5/2018 Choi ..................... H04L 7/0037
2019/0171536 A1   6/2019 Refaeli et al.

OTHER PUBLICATIONS

Infineon, "Product Brief TS264DA-AURIX™ family—Dedicated to driver assistance systems," www.infineon.com/AURIX, Mar. 2019, 2 pages, Infineon Technologies AG, Munich, DE.

NXP, "MPC5744P Product Brief 32-bit Qoriwa dual-core MCU built on Power Architecture® technology, suitable for ISO26262 ASIL-D chassis and safety applications," NXP Freescale Semiconductor Product Brief, Document No. MPC5744PPB, Rev. 2, Jun. 2012, 36 pages.

* cited by examiner

[Fig 1]
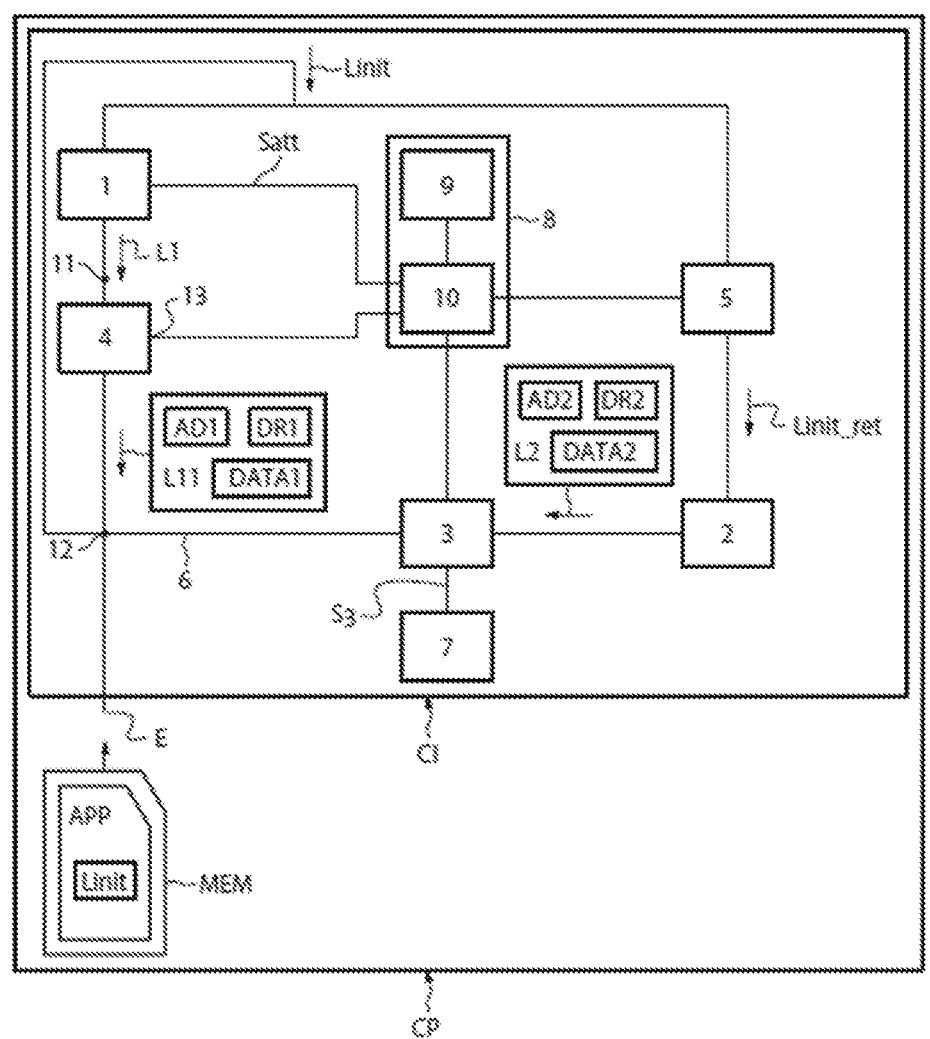

[Fig 2]
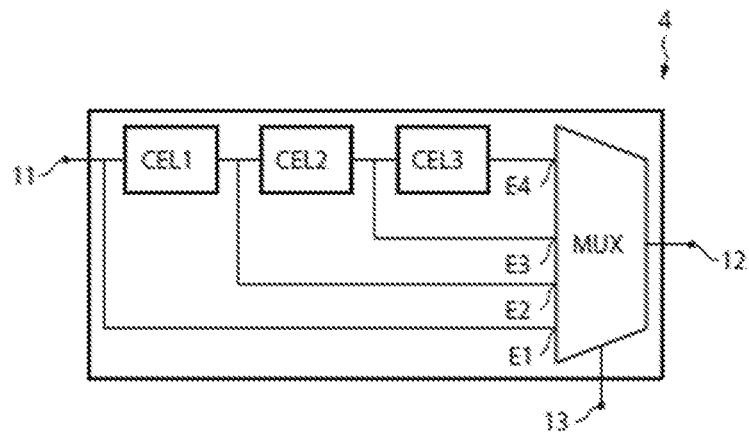
[Fig 3]
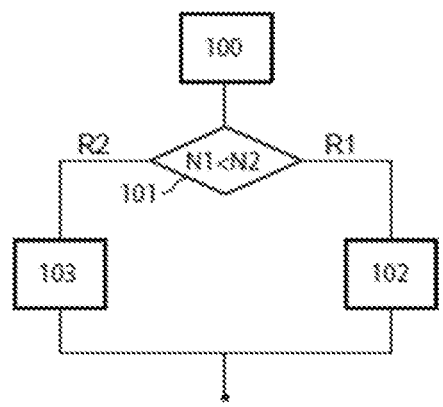
[Fig 4]
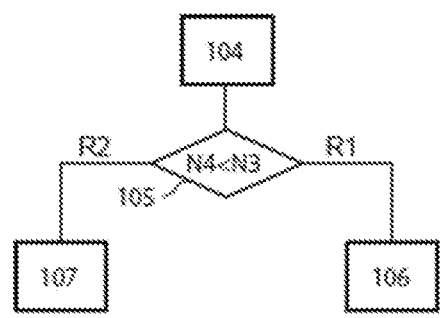

[Fig 5]
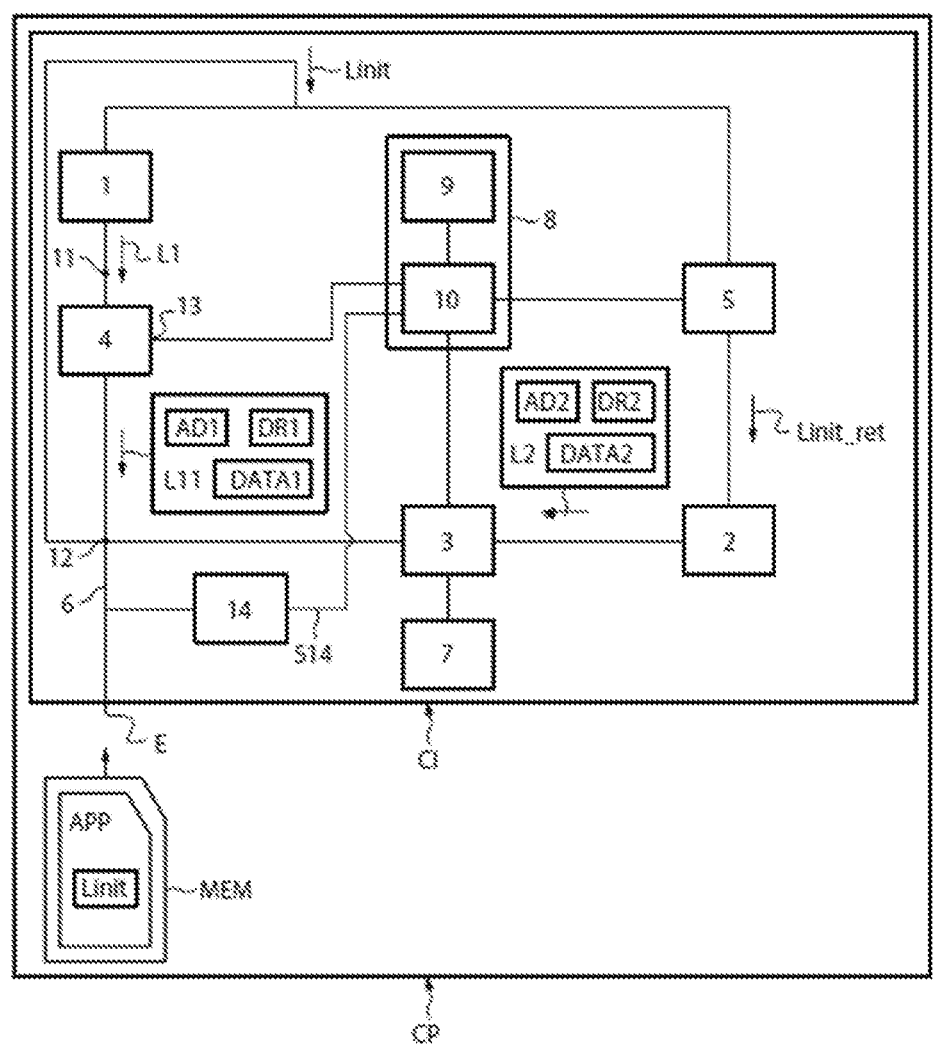

[Fig 6]
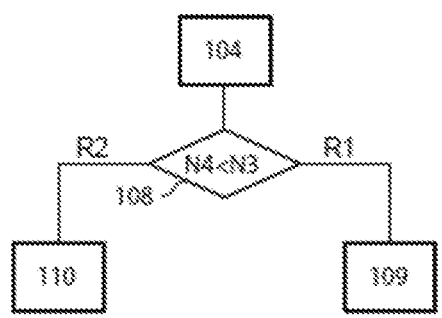
[Fig 7]
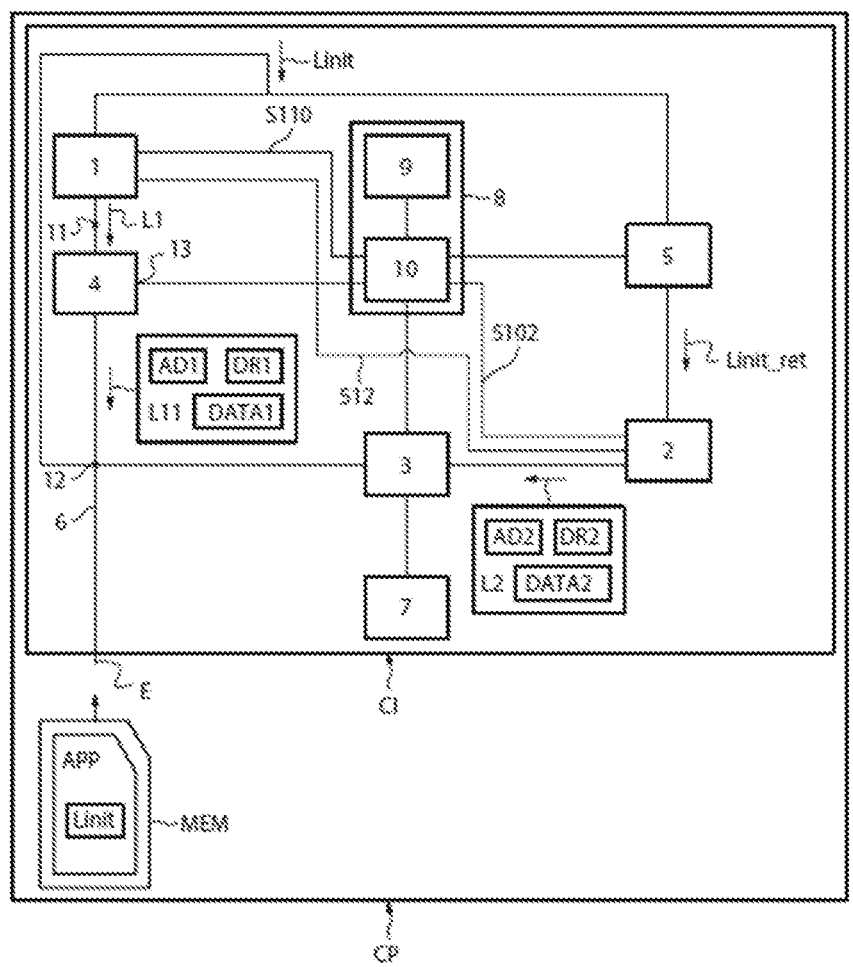

[Fig 8]
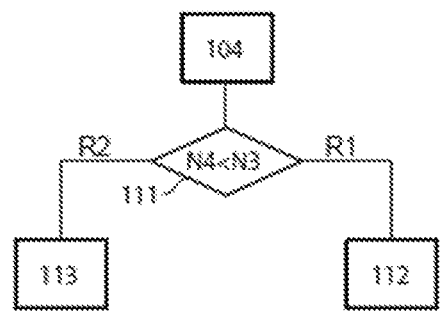
[Fig 9]
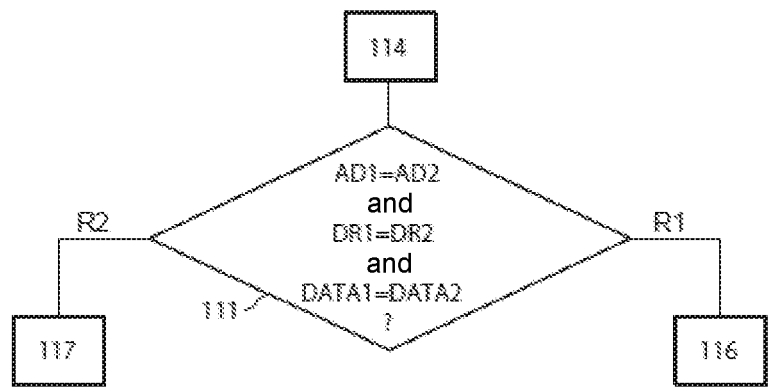

[Fig 10]
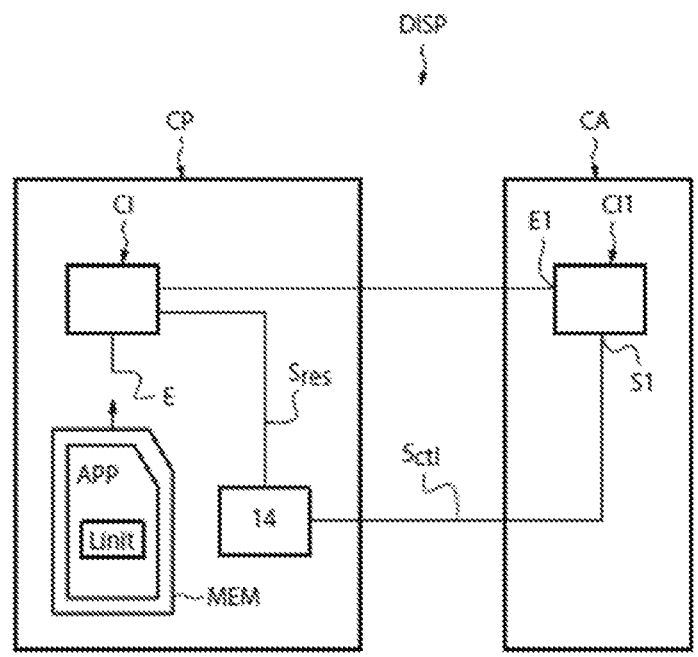

METHOD FOR AUTHENTICATING AN
ON-CHIP CIRCUIT AND ASSOCIATED
SYSTEM ON-CHIP

CROSS-REFERENCE TO RELATED
APPLICATIONS

This application claims the benefit of French Application No. 1911680, filed on Oct. 18, 2019, which application is hereby incorporated herein by reference.

TECHNICAL FIELD

Implementations and embodiments of the invention relate to systems on a chip and more particularly to the authentication of electronic chips forming systems on a chip (SoCs).

BACKGROUND

To prevent fault injection attacks, a system on a chip may comprise two processing units (CPUs), one operating as the master CPU and the other as a "verifier" CPU. The two processing units run the same program code and receive the same input data.

SUMMARY

The outputs of the two central units are compared in order to identify any errors in the master or slave CPU during operation.

Reference may be made to document US 2008/0244305, which discloses an architecture comprising a first CPU, a second CPU, a first delay stage, a second delay stage, and a comparison unit. The CPUs are configured to execute the same instructions of an application program in a signal. The first CPU receives an initial signal as input, processes it and delivers the processed initial signal to the first delay stage, and then the processed initial signal is delivered to the comparison unit. In contrast, the second CPU receives the initial signal delayed by the second delay stage as input, processes it and delivers it to the comparison unit, which compares the two signals.

The first and second delay stages are configured such that the comparison unit compares the data generated by the execution, at different times, of the same instructions by the first and second CPUs, the delay stages making a fault injection attack more complicated.

However, since the delays induced by the first and second delay stages are fixed, it is straightforward to determine the value of the delays by observing the inputs and outputs of the first and second delay stages.

There is a need to improve the security of the integrated circuit, in particular against fault injection attacks.

According to implementations and embodiments, what is advantageously proposed is to execute the same instruction line of an application program using different processing units of a chip, to delay the transmission of a first processed line by a first processing unit by a variable value, and to delay the transmission of the instruction line to a second processing unit by the variable value.

According to one aspect, what is proposed is an authentication method for a system on a chip, comprising an operation of receiving an initial data line, and a first operation of processing the initial data line using a first processing unit so as to deliver a first processed data line; an operation of applying a first delay to the first processed data line so as to deliver a delayed first processed data line; an operation of applying a second delay to the initial data line so as to deliver a delayed initial data line; a second operation of processing the delayed initial data line using a second processing unit so as to deliver a delayed second processed data line; an operation of comparing the contents of the delayed first and second processed lines; and an operation of delivering a non-authentication signal if the contents are not identical, the first and second delays being equal to a variable value.

Since the first and second delays are equal to a variable value, an attacker would find it difficult to identify the value of the delay by observing inputs and outputs of the processing units.

According to one implementation, the variable value is determined randomly.

The value of the delays changes randomly so as to prevent an attacker from identifying a predetermined delay-value sequence.

According to another implementation, the delayed first and second processed data lines comprise a first address and a second address, a first permission set and a second permission set and a first data set and a second data set, respectively, the method comprising a first operation of comparing the first and second addresses; a second operation of comparing the first and second permission sets; and a third operation of comparing the first and second data sets.

According to yet another implementation, the method comprises the operation of delivering the non-authentication signal when at least one of the operations of comparing the first and second addresses, the first and second permission sets or the first and second data sets is not identical.

According to yet another implementation, the method comprises an operation of increasing the variable value of the first and second delays by activating at least one delay cell that is configured to delay the transmission of a signal through the latter, the operation of comparing the content of the delayed first and second processed lines being inactive for the duration of activation of the delay cell.

According to yet another implementation, the method comprises an operation of decreasing the variable value of the first and second delays by deactivating at least one delay cell that is configured to delay the transmission of a signal through the latter when the first processing unit receives a wait command.

The time for decreasing the value of the delay is determined.

According to yet another implementation, the method comprises an operation of decreasing the variable value of the first and second delays by deactivating at least one delay cell between the transmission of a request for an instruction line by the first processing unit and the reception of the line by the first processing unit, the delay cell being configured to delay the transmission of a signal through them.

The value of the delay is decreased during a latency time so as not to slow the execution of the application program by the first processing unit.

According to yet another implementation, the method comprises an operation of decreasing the variable value of the first and second delays by deactivating at least one delay cell between the execution of an instruction line containing at least one branch instruction and the execution of the instruction line indicated by the branch instruction, the delay cell being configured to delay the transmission of a signal through them.

The value of the delay is decreased during a latency time so as not to slow the execution of the application program by the first processing unit.

According to another aspect, what is proposed is a system on chip, comprising an input for receiving an initial data line, and a first processing unit coupled to the input and configured to process the initial data line and to deliver a first processed data line; first delay means that are coupled to the output of the first processing unit and configured to deliver a delayed first processed data line delayed by a first delay; second delay means that are coupled to the input and configured to deliver the delayed initial data line delayed by a second delay; a second processing unit coupled to the output of the second delay means and configured to process the delayed initial data line and to deliver a delayed second processed data line; and comparison means that are configured to compare the contents of the delayed first and second processed lines and to deliver a non-authentication signal if the contents are not identical, the first and second delays being equal to a variable value.

According to one embodiment, the delayed first and second processed data lines comprise a first address and a second address, a first permission set and a second permission set and a first data set and a second data set, respectively, the comparison means being configured to compare the first and second addresses, the first and second permission sets and the first and second data sets with one another.

According to another embodiment, the comparison means are configured to transmit the non-authentication signal when at least one of the operations of comparing the first and second addresses, the first and second permission sets or the first and second data sets is not identical.

According to yet another embodiment, the first and second delay means each comprise at least one delay cell that is configured to delay the transmission of a signal through the latter, the device further comprising control means that are configured to activate or to deactivate the delay cell of the first and second delay means so as to increase or to decrease the variable value, respectively.

According to yet another embodiment, the control means are further configured to deactivate the comparison means for the duration of activation of the delay cell of the first and second delay means.

According to yet another embodiment, the control means are further configured to transmit a wait command to the first processing unit at the same time as the deactivation of the delay cell of the first and second delay means.

According to yet another embodiment, the control means are further configured to deactivate the delay cell of the first and second delay means between the transmission of a request for an instruction line by the first processing unit and the reception of the line by the first processing unit.

According to yet another embodiment, the control means are further configured to deactivate the delay cell of the first and second delay means between the execution of an instruction line containing at least one branch instruction and the execution of the instruction line indicated by the branch instruction.

According to yet another embodiment, the control means comprise a random number generator that is connected to a delay handler configured to control the first and second delay means according to the random number generator.

According to yet another aspect, what is proposed is an item of equipment comprising a system on a chip such as defined above.

According to yet another aspect, what is proposed is an authentication device for an electronic accessory comprising an item of equipment such as defined above and an electronic accessory cooperating with the item of equipment and including a system on a chip such as defined above, the item of equipment being configured to deliver the initial data line to the accessory, and the accessory being configured to deliver a check signal that is indicative of the result of the comparison carried out by the accessory to the item of equipment, the item of equipment being configured to compare the check signal with a result signal that is indicative of the result of the comparison carried out by the item of equipment.

BRIEF DESCRIPTION OF THE DRAWINGS

Other advantages and features of the invention will become apparent upon examining the detailed description of completely non-limiting embodiments and the appended drawings, in which:

FIG. 1 illustrates a first embodiment of a system on a chip incorporated within an item of electronic equipment;

FIG. 2 illustrates an example of a delay means;

FIG. 3 illustrates an exemplary implementation of the SoC when the variable value T_ret is increased;

FIG. 4 illustrates an exemplary implementation of the SoC when the variable value T_ret is decreased;

FIG. 5 illustrates a second embodiment of the SoC;

FIG. 6 illustrates an exemplary implementation of the SoC when the variable value T_ret is decreased;

FIG. 7 illustrates a third embodiment of the SoC;

FIG. 8 illustrates an exemplary implementation of the SoC when the variable value T_ret is decreased;

FIG. 9 illustrates an exemplary implementation of the comparison unit; and

FIG. 10 illustrates an example of an authentication device for an accessory comprising an item of equipment and an electronic accessory.

DETAILED DESCRIPTION OF ILLUSTRATIVE EMBODIMENTS

Reference is made to FIG. 1, which shows a first embodiment of a system on a chip CI incorporated within an item of electronic equipment CP.

The system on a chip CI comprises a first processing unit 1, a second processing unit 2, comparison means 3, first delay means 4, second delay means 5, a bus 6, an error handler 7 and control means 8 comprising a random number generator 9 and a delay handler 10.

The system on a chip CI comprises an input E for receiving an initial data line Linit, the first processing unit 1 coupled to the input E and configured to process the initial line Linit and to deliver a first processed data line L1.

The system CI further comprises the first delay means 4 that are coupled to the output of the first processing unit 1 and configured to deliver the first processed data line L1 delayed L11 by a first delay, and the second delay means 5 that are coupled to the input E and configured to deliver the initial data line Linit delayed Linit_ret by a second delay.

The system CI includes the second processing unit 2 coupled to the output of the second delay means 5 and configured to process the delayed initial data line Linit_ret and to deliver a delayed second processed data line L2.

The system CI further comprises comparison means 3 that are configured to compare the contents of the delayed first and second processed data lines L11 and L2 and to deliver a non-authentication signal S3 if the contents are not identical, the first and second delays being equal to a variable value T_ret.

The variable value T_ret is determined randomly.

The initial data line Linit is for example an instruction line of an application program APP stored in a non-volatile memory such as a flash memory MEM located outside the circuit CI and connected to the input E.

The input E is additionally connected to the bus 6 of the system CI, the bus 6 being connected to the processing units 1 and 2, to the first and second delay means 4, 5 and to the comparison means 3.

Of course, as a variant, the memory MEM may be located in the system CI.

Since the variable value T_ret is determined randomly, an attacker would not be able to identify the value of the first and second delays by observing the inputs and outputs of the processing units 1 and 2.

The first and second delay means 4 and 5 are identical in terms of architecture and will be described hereinafter.

The delayed first and second processed data lines L11 and L2 comprise a first address AD1 and a second address AD2, a first permission set DR1 and a second permission set DR2 and a first data set DATA1 and a second data set DATA2, respectively.

Of course, the contents of the delayed first and second processed data lines L11 and L2 may be organized differently, for example contain no permission sets DR1 and DR2.

The comparison means 3 are determined to compare the first and second addresses AD1 and AD2, the first and second permission sets DR1 and DR2, and the first and second data sets DATA1 and DATA2.

Each permission set DR1, DR2 comprises for example a write permission for one or more data in a memory, a read permission for one or more data or instructions in a memory or an execute permission for an application program. Of course, each permission set may comprise one or more of the permissions mentioned above.

The comparison means 3 are configured to transmit the non-authentication signal S3 when at least the first and second addresses AD1 and AD2, the first and second permission sets DR1 and DR2 or the first and second data sets DATA1 and DATA2 are not identical.

The comparison means transmit for example the non-authentication signal S3 to the error handler 7 of the system CI which may for example restart or freeze the system CI, reset the processing units 1 and 2 or store a non-authentication code in a memory for later use.

The system CI allows for example the first or the second processing unit 2 to be authenticated according to the result of the comparisons.

If the signal S3 is transmitted, the first or the second processing unit 2 is not identical to the other processing unit, and consequently one of the processing units has for example been subjected to a fault injection attack.

The control means 8 comprise the random number generator 9 connected to the delay handler 10, which is configured to control the first and second delay means 4, 5 according to the random number generator.

The control means 8 are produced for example from logic circuits including logic gates.

The first delay means 4 comprise an input 11 connected to an output of the processing unit 1 which delivers the line L1, an output 12 connected to the comparison means 3 and to the bus 6, and a control input 13 connected to and controlled by the delay handler 10.

Since the first and second delay means 4 and 5 are identical in terms of architecture, only the example of the first delay means 4 is illustrated in FIG. 2, but the second delay means 5 also comprise an input which receives the signal Linit, an output connected to an input of the processing unit 2 which delivers the signal Linit_ret, and a control input connected to and controlled by the delay manager.

The delay means 4 further comprise three identical delay cells CEL1, CEL2 and CEL3 and a multiplexer MUX which is controlled by the control means 8.

Each delay cell CEL1, CEL2 and CEL3 is produced for example from a memory element, for example a flip-flop.

The input 11 is connected to a first input E1 of the multiplexer MUX and to an input of the first cell CEL1, an output of the cell CEL1 being connected to a second input E2 of the multiplexer MUX.

The second cell CEL2 comprises an input connected to the output of the first cell CEL1, and an output connected to a third input E3 of the multiplexer MUX and to an input of the third cell CEL3.

The third cell CEL3 comprises an input connected to the output of the second cell CEL2, and an output connected to a fourth input E4 of the multiplexer MUX, an output of the multiplexer being connected to the output 12.

Each delay cell CEL1, CEL2 and CEL3 is configured to delay the transmission of a signal passing through same, for example by one cycle of a clock setting the bus 6 speed.

The delay handler 10 is configured to activate or to deactivate the delay cells CEL1, CEL2 and CEL3 so as to increase or to decrease the variable value T_ret, respectively.

Depending on the input of the multiplexer MUX activated by the control means 8, the signal received at the input 11 is delayed by one, two or three clock cycles (input E2, E3 or E4 activated), or is not delayed (input E1 activated).

The second delay means 5 are controlled simultaneously by the control means 8 such that the same input of the multiplexer MUX is activated so that the transmission of the line Linit is delayed by the variable value T_ret.

Of course, the delay means 4 may comprise more than three delay cells or fewer than three delay cells, the delay means comprising at least one delay cell.

The delay handler 10 is further configured to deactivate the comparison means 3 for a duration of activation Tact of at least one delay cell CEL1, CEL2, CEL3 of the first and second delay means 4, 5.

The duration of activation Tact is proportional to the number of cells activated. If two cells are activated, the duration Tact is equal to two clock cycles, and if three cells are activated, the duration Tact is equal to three clock cycles.

The duration of activation Tact allows the comparison results generated by the comparison means 3 not to be taken into account until the lines L11 and L2 are again synchronized with the inputs of the comparison means 3 so that error messages caused by the change in the variable value T_ret are not taken into account.

FIG. 3 illustrates an exemplary implementation of the system on a chip CI when the variable value T_ret is increased for all described embodiments of the system CI.

The variable value T_ret is initially assumed to be zero.

In a first step 100, the variable value T_ret is determined randomly. The random generator 9 draws a non-zero number N1.

Next, in a step 101, the delay handler 10 determines whether the number N1 is larger or smaller than the number N2 of delay cells CEL1, CEL2, CEL3.

If the answer is Yes (R1), the number drawn N1 is smaller than the number of cells N2, the delay handler 10 controls the first and second delay means 4, 5 by activating N1 delay cells in order to delay the transmission of the line L1 to the comparison means 3 and the transmission of the line Linit to the processing unit 2 by N1 clock cycles, and controls the comparison means 3 such that they are inactive for N1 clock cycles corresponding to the duration of activation Tact of the delay means 4 and 5 (step 102).

If the answer is No (R2), the number drawn N1 is larger than the number of cells N2, the delay handler 10 controls the first and second delay means 4, 5 by activating N2 delay cells in order to delay the transmission of the line L1 to the comparison means 3 and the transmission of the line Linit to the processing unit 2 by N2 clock cycles, and controls the comparison means 3 such that they are inactive for N2 clock cycles corresponding to the duration of activation Tact of the delay means 4 and 5 (step 103).

In the first embodiment illustrated in FIG. 1, the delay handler 10 is further configured to transmit a wait command Satt to the first processing unit 1 at the same time as the deactivation of at least one delay cell CEL1, CEL2, CEL3 of the first 4 and second 5 delay means.

The wait command Satt is configured to freeze the processing unit 1 for a duration of deactivation Tdes of at least one delay cell CEL1, CEL2, CEL3.

The duration of deactivation Tdes is proportional to the number of cells deactivated. If two cells are deactivated, the duration Tdes is equal to two clock cycles, and if three cells are deactivated, the duration Tdes is equal to three clock cycles.

The duration of deactivation Tdes allows the reception of the lines L11 and L2 to be synchronized with the inputs of the comparison means 3 following the decrease in the variable value T_ret.

Reference is made to FIG. 4, which illustrates an exemplary implementation of the integrated circuit CI when the variable value T_ret is decreased in the case of the first embodiment of the system CI illustrated in FIG. 1.

It is assumed that the variable value T_ret is non-zero and equal to N3 clock cycles (N3 delay cells activated).

In a first step 104, the random generator 9 draws a non-zero number N4.

Next, in a step 105, the delay handler 10 determines whether the number N4 is larger or smaller than the number N3 of cells activated.

If the answer is Yes (R1), the number drawn N4 is smaller than the number of cells activated N3, the delay handler 10 controls the first and second delay means 4, 5 by deactivating N3-N4 delay cells in order to decrease the delay of the transmission of the line L1 to the comparison means 3 and of the transmission of the line Linit to the processing unit 2 by N3 to N4 clock cycles, and transmits the wait command Satt to the first processing unit 1 at the same time as the deactivation of the delay cell of the first and second delay means 4 and 5 (step 106).

If the answer is Yes (R2), the number drawn N4 is larger than the number of cells activated N3, the delay handler 10 controls the first and second delay means 4, 5 by deactivating N3 delay cells, and transmits the wait command Satt to the first processing unit 1 at the same time as the deactivation of the one or more delay cells of the first and second delay means 4 and 5 (step 107).

FIG. 5 describes a second embodiment of the system on a chip CI.

This embodiment differs from the first embodiment illustrated in FIG. 1 in that it further comprises a handler 14 for the bus 6 connected to the delay handler 10, the delay handler 10 not being connected to the first processing unit 1.

The delay handler 10 is further configured to deactivate at least one delay cell CEL1, CEL2, CEL3 of the first 4 and second 5 delay means between the transmission of a request for an instruction line by the first processing unit and the reception of the line by the first processing unit.

The bus handler 14 transmits a signal S14 that is indicative of the processing state of the request transmitted by the processing unit 1 to the delay handler 10.

Reference is made to FIG. 6, which illustrates an exemplary implementation of the system CI when the variable value T_ret is decreased in the case of the second embodiment of the circuit CI illustrated in FIG. 5.

It is assumed that the variable value T_ret is non-zero and equal to N3 clock cycles (N3 delay cells activated).

There is again step 104, described above.

In the first step 104, the random generator 9 draws the non-zero number N4.

Next, in step 108, the delay handler 10 determines whether the number N4 drawn is larger or smaller than the number N3 of cells activated.

If the answer is Yes (R1), the number drawn N4 is smaller than the number of cells activated N3, the delay handler 10 controls the first and second delay means 4, 5 by deactivating N3-N4 delay cells in order to decrease the delay of the transmission of the line L1 to the comparison means 3 and of the transmission of the line Linit to the processing unit 2 by N3 to N4 clock cycles between a next transmission of a request for an instruction line by the first processing unit 1 and the reception of the line by the first processing unit 1 (step 109).

If the answer is No (R2), the number drawn N4 is larger than the number of cells activated N3, the delay handler 10 controls the first and second delay means 4, 5 by deactivating Ndes1 delay cells between the next transmission of a request for an instruction line by the first processing unit 1 and the reception of the line by the first processing unit 1 (step 110), the detection of the transmission of a request for an instruction line and the reception of the line by the first processing unit 1 being carried out by the handler 14, Ndes1 being the minimum value chosen from N3 and the number of clock cycles needed to process the request for example by means of the memory MEM.

The handler 14 transmits the signal S14 to the delay handler 10.

FIG. 7 illustrates a third embodiment of the system on a chip CI.

This embodiment differs from the first embodiment illustrated in FIG. 1 in that the delay manager 10 receives a signal S110 transmitted by the processing unit 1 and indicative of the execution of a branch instruction by the unit 1. Additionally, the handler 10 is connected to the second processing unit 2 so as to transmit a signal S102 of the second processing unit 2 taking into account a signal S12 transmitted by the first unit 1 and received over an input of the second processing unit.

A branch instruction comprises any instruction causing a purge of the information transmission channel (pipeline) of the first processing unit 1 or a temporary freeze of the first processing unit 1.

The delay handler 10 is further configured to deactivate at least one delay cell CEL1, CEL2, CEL3 of the first 4 and second 5 delay means between the execution of an instruction line containing at least one branch instruction and the execution of the instruction line indicated by the branch instruction.

Reference is made to FIG. 8, which illustrates an exemplary implementation of the system CI when the variable value T_ret is decreased in the case of the second embodiment of the system CI illustrated in FIG. 5.

It is assumed that the variable value T_ret is non-zero and equal to N3 clock cycles (N3 delay cells activated).

There is again step 104, described above.

In the first step 104, the random generator 9 draws the non-zero number N4 randomly.

Next, in step 111, the delay handler 10 determines whether the number N4 drawn is larger or smaller than the number N3 of cells activated.

If the answer is Yes (R1), the number drawn N4 is smaller than the number of cells activated N3, the delay handler 10 controls the first and second delay means 4, 5 by deactivating N3-N4 delay cells in order to decrease the delay of transmission of the line L1 to the comparison means 3 and of the line Linit to the processing unit 2 by N3 to N4 clock cycles between a next execution of an instruction line containing at least one branch instruction and the execution of the instruction line indicated by the branch instruction, the delay cell being configured to delay the transmission of a signal passing through them.

The delay handler 10 deactivates, upon reception of the signal S110 transmitted by the first processing unit 1, N3 delay cells of the first and second delay means 4, 5, and transmits the signal S12 such that the processing unit 2 executes the instruction of the instruction line indicated by the branch instruction so as to synchronize the outputs of the processing units 1 and 2 (step 112).

If the answer is No (R2), the number drawn N4 is larger than the number of cells activated N3, the delay handler 10 controls the first and second delay means 4, 5 by deactivating Ndes2 cells between a next execution of an instruction line containing at least one branch instruction and the execution of the instruction line indicated by the branch instruction, the delay cell being configured to delay the transmission of a signal passing through them as described above, Ndes2 being the minimum value chosen from N3 and the number of clock cycles needed to purge the information transmission channel (pipeline) of the first processing unit 1.

FIG. 9 illustrates an exemplary implementation of the comparison means 3.

The comparison means 3 receive, as input, the delayed first and second processed data lines L11 and L2 (step 114).

The comparison means carry out a first comparison of the first and second addresses AD1 and AD2, a second comparison of the first and second permission sets DR1 and DR2, and a third comparison of the first and second data sets DATA1 and DATA2 (step 115).

If the answer is Yes (R1), the first and second addresses AD1 and AD2, the first and second permission sets DR1 and DR2, and the first and second data sets DATA1 and DATA2 are identical, and the comparison means 3 transmit no signal (step 116).

If the answer is No (R2), the first and second addresses AD1 and AD2, the first and second permission sets DR1 and DR2, or the first and second data sets DATA1 and DATA2 are not identical, and the comparison means 3 transmit the non-authentication signal S3 (step 117).

In the first embodiment of the integrated circuit CI illustrated in FIG. 1, the variable value T_ret is modified when the handler 10 sends the signal Satt allowing the time at which the variable value T_ret is changed to be controlled, unlike the second and third embodiments illustrated in FIGS. 6 and 7 which are dependent on the event resulting from the execution of data lines by the processing unit 1.

In the first embodiment, the processing unit 1 is paused while the variable value T_ret is being changed, leading to the execution of the application program APP being slowed down, unlike the second and third embodiments which implement the changing of the variable value T_ret during latency periods of the processing unit 1.

FIG. 10 illustrates an example of an authentication device DISP for an accessory comprising the item of equipment CP and an electronic accessory CA cooperating with the item of equipment CP.

The authentication device makes it possible identify whether the accessory CA is connected to the item of equipment CP.

The item of equipment CP is for example a smartphone and the accessory CA is for example a smartphone charger.

The authentication device makes it possible to identify, for example, whether the smartphone and the charger are of the same brand.

The accessory CA includes a system on a chip CI1 which is identical to the circuit on a chip CI.

The item of equipment CP is further configured to deliver the initial data line Linit to the accessory CA, and the accessory CA is configured to deliver a check signal Sct1 that is indicative of the result of the comparison carried out by the accessory CA to the item of equipment CP.

The item of equipment CP is configured to compare the check signal Sct1 with a result signal Sres that is indicative of the result of the comparison carried out by the item of equipment CP.

The item of equipment CP further comprises a comparison module 14 configured to compare the signals Sct1 and Sres.

The system CI is further configured to deliver the initial line Linit over the input E1 of the system CI1 and to deliver the signal Sct1 over a first input of the comparison module 14.

The system CI1 is further configured to deliver the signal Sct1 over a second input of the comparison module 14.

If the signals Sct1 and Sres are identical, the accessory CA is authenticated by the item of equipment CP.

If the signals Sct1 and Sres are different, the accessory CA is not authenticated by the item of equipment CP. In this case, at least one of the processing units of the accessory CA or of the item of equipment CP has been subjected to a fault injection attack.

What is claimed is:

1. A method for authenticating a system on a chip, comprising:
   receiving an initial data line;
   first processing, using a first processing unit, the initial data line to generate a first processed data line;
   applying, using a first delay unit, a first delay to the first processed data line to generate a delayed first processed data line;
   applying, using a second delay unit, a second delay to the initial data line to generate a delayed initial data line, the first and second delays being equal to a variable value such that the first and second delays are changing in value across different authenticating operations;
   second processing, using a second processing unit, the delayed initial data line to generate a delayed second processed data line;
   comparing, using a comparison unit, contents of the delayed first and second processed data lines, the comparison unit being deactivated for a duration corresponding to the variable value before comparing the contents of the delayed first and second processed data lines; and
   generating a non-authentication signal in response to the contents not being identical.

2. The method according to claim 1, further comprising randomly determining the variable value.

3. The method according to claim 1, the delayed first and second processed data lines comprising a first address and a second address, a first permission set and a second permission set, and a first data set and a second data set, respectively, and the comparing the contents of the delayed first and second processed data lines comprising:
  comparing the first and second addresses;
  comparing the first and second permission sets; and
  comparing the first and second data sets.

4. The method according to claim 3, further comprising generating the non-authentication signal in response to at least one of the first and second addresses, the first and second permission sets, or the first and second data sets, respectively, not being identical.

5. The method according to claim 1, further comprising increasing the variable value of the first and second delays by activating at least one delay cell, the comparing the contents of the delayed first and second processed lines being inactive while the delay cell is activated.

6. The method according to claim 1, further comprising decreasing the variable value of the first and second delays by deactivating at least one delay cell in accordance with the first processing unit receiving a wait command.

7. The method according to claim 1, further comprising decreasing the variable value of the first and second delays by deactivating at least one delay cell between a transmission of a request for an instruction line by the first processing unit and a reception of the instruction line by the first processing unit.

8. The method according to claim 1, further comprising decreasing the variable value of the first and second delays by deactivating at least one delay cell between an execution of an instruction line containing at least one branch instruction and an execution of an instruction line indicated by the branch instruction.

9. A system on a chip (SoC) comprising:
  an input configured to receive an initial data line;
  a first processing unit coupled to the input, and configured to process the initial data line and provide a first processed data line;
  a first delay unit coupled to an output of the first processing unit, and configured to generate a delayed first processed data line delayed by a first delay;
  a second delay unit coupled to the input, and configured to generate a delayed initial data line delayed by a second delay, wherein the first and second delays are equal to a variable value such that the first and second delays are changing in value across different authenticating operations;
  a second processing unit coupled to an output of the second delay unit, and configured to process the delayed initial data line and generate a delayed second processed data line; and
  a comparison unit configured to compare contents of the delayed first and second processed data lines, and generate a non-authentication signal if the contents are not identical, the comparison unit being deactivated for a duration corresponding to the variable value before comparing the contents of the delayed first and second processed data lines.

10. The SoC according to claim 9, wherein the delayed first and second processed data lines comprise a first address and a second address, a first permission set and a second permission set, and a first data set and a second data set, respectively, and wherein the comparison unit is configured to:
  compare the first and second addresses;
  compare the first and second permission sets; and
  compare the first and second data sets.

11. The SoC according to claim 10, wherein the comparison unit is configured to transmit the non-authentication signal in response to at least one of the first and second addresses, the first and second permission sets, or the first and second data sets, respectively, is not identical.

12. The SoC according to claim 9, wherein the first and second delay units each comprises at least one delay cell, and wherein the SoC further comprises a controller configured to activate or deactivate the delay cell of the first and second delay units so as to increase or to decrease the variable value, respectively.

13. The SoC according to claim 12, wherein the controller is further configured to deactivate the comparison unit for a duration of activation of the delay cell of the first and second delay units.

14. The SoC according to claim 12, wherein the controller is further configured to transmit a wait command to the first processing unit at a same time as the deactivation of the delay cell of the first and second delay units.

15. The SoC according to claim 12, wherein the controller is further configured to deactivate the delay cell of the first and second delay units between a transmission of a request for an instruction line by the first processing unit and a reception of the instruction line by the first processing unit.

16. The SoC according to claim 12, wherein the controller is further configured to deactivate the delay cell of the first and second delay units between an execution of an instruction line containing at least one branch instruction and an execution of an instruction line indicated by the branch instruction.

17. The SoC according to claim 12, wherein the controller comprises:
  a random number generator; and
  a delay handler coupled to the random number generator, and configured to control the first and second delay units in accordance with the random number generator.

18. An electronic system comprising:
  an electronic accessory, comprising a first system on a chip (SoC), the first SoC comprising:
    a first input configured to receive a first initial data line;
    a first processing unit coupled to the first input, and configured to process the first initial data line and provide a first processed data line;
    a first delay unit coupled to an output of the first processing unit, and configured to generate a delayed first processed data line delayed by a first delay;
    a second delay unit coupled to the first input, and configured to generate a delayed first initial data line delayed by a second delay, wherein the first and second delays are equal to a first variable value such that the first and second delays are changing in value across different authenticating operations;
    a second processing unit coupled to an output of the second delay unit, and configured to process the delayed first initial data line and generate a delayed second processed data line; and
    a first comparison unit configured to compare first contents of the delayed first and second processed data lines, and generate a first authentication signal indicating whether the first contents are identical, the first comparison unit being deactivated for a first duration corresponding to the first variable value before comparing the contents of the delayed first and second processed data lines;

wherein the electronic accessory is configured to send a check signal indicative of a result of the comparison performed by the electronic accessory to an item of equipment; and the item of equipment, comprising a second SoC, the second SoC comprising:
- a second input configured to receive a second initial data line;
- a third processing unit coupled to the second input, and configured to process the second initial data line and provide a third processed data line;
- a third delay unit coupled to an output of the third processing unit, and configured to generate a delayed third processed data line delayed by a third delay;
- a fourth delay unit coupled to the second input, and configured to generate a delayed second initial data line delayed by a fourth delay, wherein the third and fourth delays are equal to a second variable value;
- a fourth processing unit coupled to an output of the fourth delay unit, and configured to process the delayed second initial data line and generate a delayed fourth processed data line; and
- a second comparison unit configured to compare second contents of the delayed third and fourth processed data lines, and generate a second authentication signal indicating whether the second contents are identical, the second comparison unit being deactivated for a second duration corresponding to the second variable value before comparing the contents of the delayed third and fourth processed data lines;

wherein the item of equipment is configured to:
- send the first initial data line to the electronic accessory; and
- compare the check signal with a result signal indicative of a result of the comparison performed by the item of equipment.

19. The electronic system of claim 18, wherein the item of equipment is a smartphone, and the electronic accessory is a smartphone charger.

20. The electronic system of claim 18, wherein the item of equipment comprises a comparison module configured to compare the check signal with the result signal.

* * * * *